United States Patent
Chatterjee et al.

(10) Patent No.: US 6,892,276 B2
(45) Date of Patent: May 10, 2005

(54) INCREASED DATA AVAILABILITY IN RAID ARRAYS USING SMART DRIVES

(75) Inventors: Paresh Chatterjee, Fremont, CA (US); Ragendra Mishra, Fremont, CA (US); Chayan Biswas, Newark, CA (US); Basavaraj Hallyal, Fremont, CA (US)

(73) Assignee: LSI Logic Corporation, Milpitas, CA (US)

( * ) Notice: Subject to any disclaimer, the term of this patent is extended or adjusted under 35 U.S.C. 154(b) by 275 days.

(21) Appl. No.: 10/304,994

(22) Filed: Nov. 26, 2002

(65) Prior Publication Data

US 2004/0103246 A1 May 27, 2004

(51) Int. Cl.$^7$ .............................................. G06F 12/00
(52) U.S. Cl. ......................................... 711/114; 714/6
(58) Field of Search ............................... 711/114; 714/6

(56) References Cited

U.S. PATENT DOCUMENTS

| | | | | |
|---|---|---|---|---|
| 5,574,882 A | * | 11/1996 | Menon et al. ............... 711/114 |
| 5,848,229 A | * | 12/1998 | Morita ............................ 714/7 |
| 5,872,906 A | * | 2/1999 | Morita et al. ................... 714/6 |
| 5,959,860 A | * | 9/1999 | Styczinski ..................... 700/12 |
| 6,058,455 A | * | 5/2000 | Islam et al. .................. 711/114 |
| 6,076,142 A | * | 6/2000 | Corrington et al. .......... 711/114 |
| 6,079,029 A | * | 6/2000 | Iwatani et al. .................. 714/6 |
| 6,223,252 B1 | * | 4/2001 | Bandera et al. .............. 711/714 |
| 6,272,442 B1 | * | 8/2001 | Jeffries ........................ 702/115 |

\* cited by examiner

Primary Examiner—Nasser Moazzam
Assistant Examiner—Jesse Diller
(74) Attorney, Agent, or Firm—Suiter West PC LLO

(57) ABSTRACT

The present invention is directed to a system and method for increased data availability. In an aspect of the present invention, a method includes receiving a SMART indication from a data storage device included in a plurality of data storage devices configured as a RAID array. Data from the data storage device which originated the SMART indication is replicated to a second data storage device. The second data storage device was not originally configured in the RAID array with the plurality of data storage devices for data storage. The data storage device which originated the SMART indication from the RAID array is removed, thereby resulting the second data storage device and the plurality of data storage devices configured as a RAID array.

3 Claims, 4 Drawing Sheets

Removing Good Drive 3.

Inserting empty Drive X.

Replicating Drive X from Drive 1.

Replacing error Drive 1 with Drive 3 from old configuration.

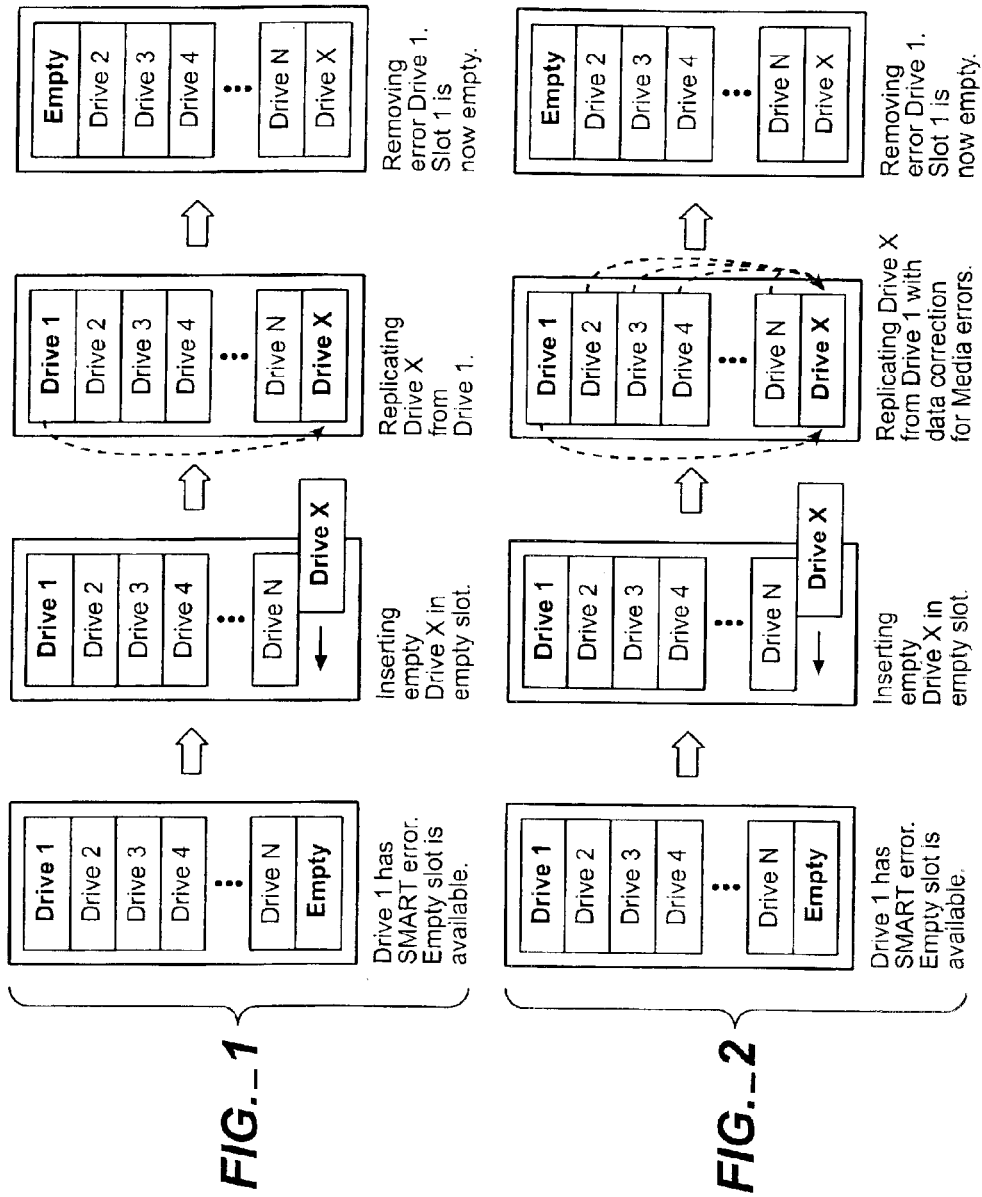

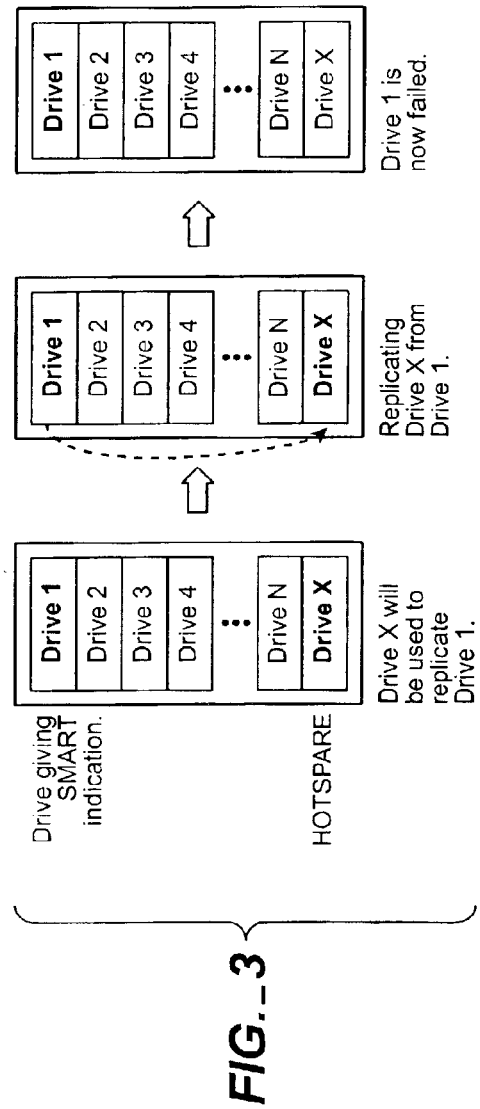
FIG._3
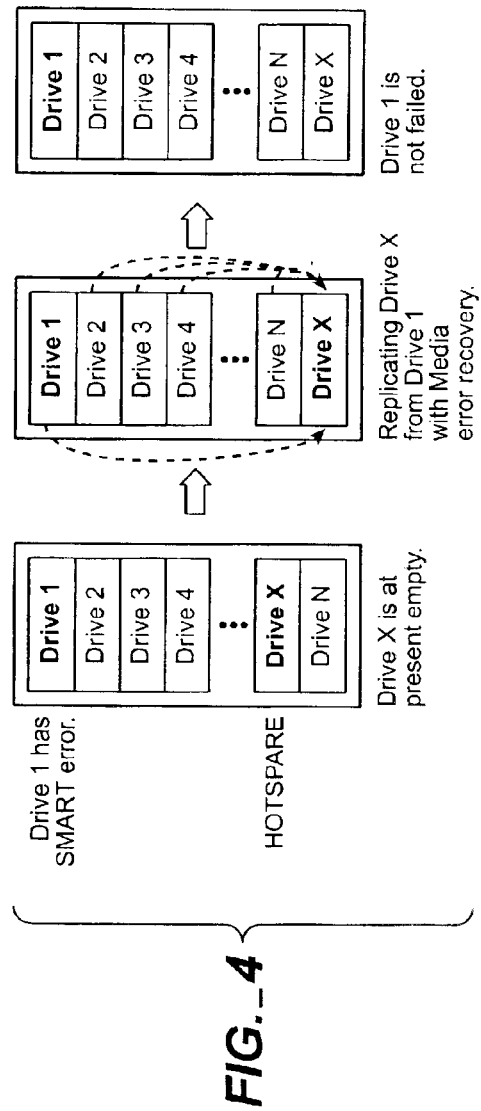
FIG._4

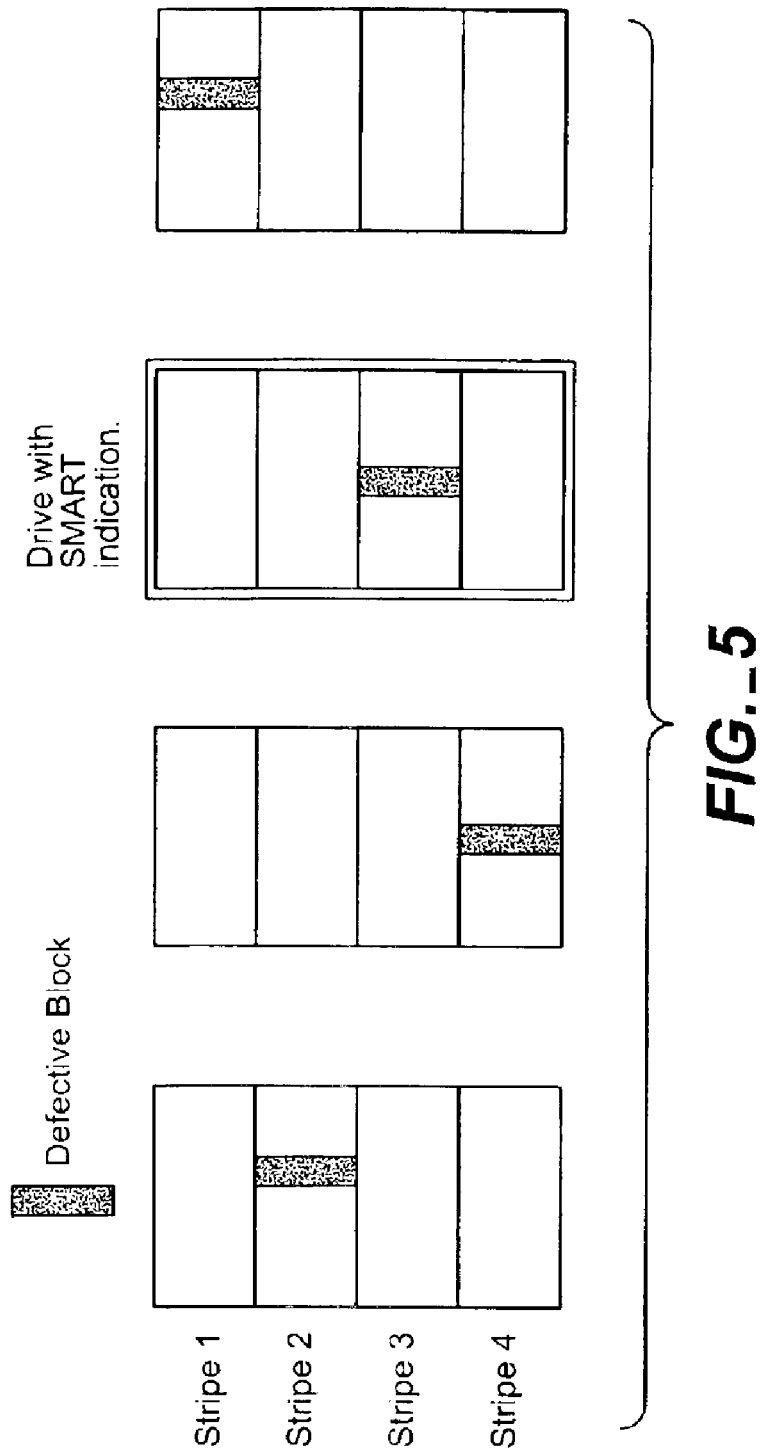
FIG._5

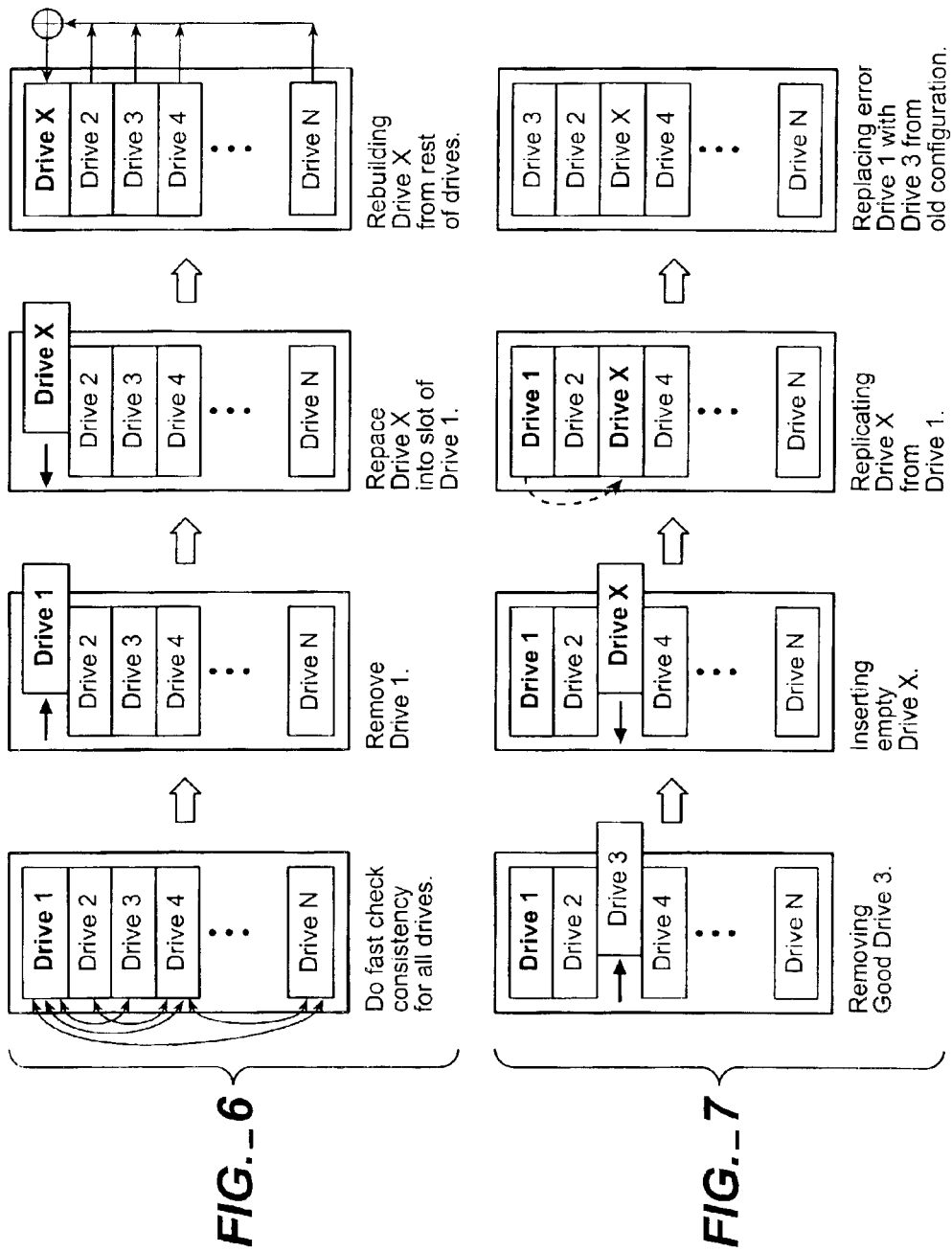

US 6,892,276 B2

INCREASED DATA AVAILABILITY IN RAID ARRAYS USING SMART DRIVES

FIELD OF THE INVENTION

The present invention generally relates to the field of data storage, and particularly to increased data availability with SMART drives.

BACKGROUND OF THE INVENTION

The storage of electronic data is one of the most important aspects of business and every day life. Therefore, increasing performance in data access and storage may have profound effects. One method utilized to provide persistent and reliable data storage is through the use of a RAID array. The basic idea of RAID is to combine multiple data storage devices into a group which yields performance exceeding that of one large, more expensive device. This array of small drives is made to appear to a computer or over a network as a single virtual drive. In addition, the array can be made fault-tolerant by redundantly storing information in various ways, such as through employing different RAID types.

To help users avoid data loss, some drive manufacturers are now incorporating logic into their drives that act as an "early warning system" or "predictive failure" for pending drive problems. This system is called Self-Monitoring Analysis and Reporting Technology or SMART. The hard disk's integrated controller monitors various aspects of its own performance and makes available status information to any software that wants to probe the drive and examine the data. Typically, SMART works by monitoring certain performance characteristics inside the disk, and looking for trends that indicate a gradual worsening in reliability that may indicate an imminent failure.

However, in the case of systems with redundant storage, system administrators have either ignored the SMART indication and waited for the drive to fail or replaced the drive before it failed, and rebuilt the drive from other redundant storage. However, in utilizing this method, the rebuild for the drive would fail if the other drive from which rebuild was performed includes media errors or the rebuild would continue including the errors. Moreover, if one of the drives from which rebuild was taking place failed, the entirety of the logical drive would fail.

Therefore, it would be desirable to provide a system and method for increased availability.

SUMMARY OF THE INVENTION

Accordingly, the present invention is directed to a system and method for increased data availability. In an aspect of the present invention, a method includes receiving a SMART indication from a data storage device included in a plurality of data storage devices configured as a RAID array. Data from the data storage device which originated the SMART indication is replicated to a second data storage device. The second data storage device was not originally configured in the RAID array with the plurality of data storage devices for data storage. The data storage device which originated the SMART indication from the RAID array is removed, thereby resulting in the second data storage device and the plurality of data storage devices configured as a RAID array.

In an additional aspect of the present invention, a system includes a plurality of data storage devices capable of giving a SMART indication. The plurality of data storage device are arranged as a RAID array, in which a SMART indication from a data storage device is issued, data from the data storage device which originated the SMART indication is replicated to a second data storage device that was not originally configured for data storage in the RAID array with the plurality of data storage devices. The data storage device which originated the SMART indication from the RAID array is removed after replication is completed, thereby resulting in a RAID array including the second data storage device and the plurality of data storage devices.

In a further aspect of the present invention, a method includes receiving a SMART indication from a data storage device included in a plurality of data storage devices configured as a RAID array. A data storage device of the plurality of data storage devices which did not originate the SMART indication is removed. The removed data storage device is replaced with a second data storage device. The second data storage device was not originally configured in the RAID array with the plurality of data storage devices for data storage. Data from the data storage device which originated the SMART indication is replicated to a second data storage device. The data storage device which originated the SMART indication from the RAID array is removed and replaced with the removed data storage device.

It is to be understood that both the forgoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which:

FIG. 1 is an illustration of an exemplary embodiment of the present invention wherein data replication for non-redundant RAID configuration with an available slot is shown;

FIG. 2 is a depiction of an exemplary embodiment of the present invention wherein data replication for redundant RAID configuration with available slot id shown;

FIG. 3 is an illustration of an exemplary embodiment of the present invention wherein data replication for non-redundant RAID configuration with HOTSPARE is shown;

FIG. 4 is an illustration of an exemplary embodiment of the present invention wherein data replication for redundant RAID configuration with available slot is shown;

FIG. 5 is a depiction of an exemplary embodiment of the present invention wherein RAID configuration with a drive giving SMART indication with media errors on other drives is shown;

FIG. 6 is an illustration of an exemplary embodiment of the present invention wherein data recovery for redundant RAID configuration with no available slot is shown; and FIG. 7 is an illustration of an exemplary embodiment of the present invention wherein data replication for non-redundant RAID with no available slot is shown.

DETAILED DESCRIPTION OF THE INVENTION

Reference will now be made in detail to the presently preferred embodiments of the invention, examples of which are illustrated in the accompanying drawings.

Referring generally now to FIGS. 1 through 7, exemplary embodiments of the present invention are shown. This present invention pertains to enhanced methods to recover data from a data storage devices, such as a hard drive, which has given SMART indication. SMART indications indicate that a drive is going to fail in near future and thus, a system administrator should address the impending failure. The invention described here automates this process and causes less interruption to use of the data storage system, and hence increases data availability.

Traditionally, for non-redundant RAID systems, the system administrator would put the system offline and backup the system before the drive fails. Then, the drive with SMART indication is replaced and the system is restored from backup before taking the system online. In case of systems with redundant storage, the system administrators have either ignored the SMART indication and waited for the drive to fail or replaced the drive before it failed, and rebuilt the drive from the other redundant storage. However, in utilizing this method, either the rebuild for the drive would fail if the other drive from which rebuild was done includes media errors or the rebuild would be allowed to continue but would still include the errors. Moreover, if one of the drives from which rebuild was taking place failed, the entirety of the logical drive would fail.

The main idea behind data recovery in case of SMART error for non-redundant RAID is to perform the data recovery without using a backup archive, which is usually a slow tape device, and also without putting the system offline. Out of six exemplary cases described herein, five methods recover data while the system and all logical drives are kept online, thus making the recovery completely transparent to the user. In the sixth case, it may be possible for the system administrator to do this operation by taking just the affected logical drive offline, while keeping the rest of the system online. In case of redundant RAID configuration, the method described herein will recover data from media error and drive failures. Also the data may restored faster as opposed to performing a full rebuild.

In an effort to help users avoid data loss, some drive manufacturers are now incorporating logic into their drives that act as an "early warning system" or "predictive failure" for pending drive problems. This system is called Self-Monitoring Analysis and Reporting Technology or SMART. The hard disk's integrated controller monitors various aspects of its own performance and makes available status information to any software that wants to probe the drive and examine the data.

Typically, SMART works by monitoring certain performance characteristics inside the disk, and looking for trends that indicate a gradual worsening in reliability that may indicate an imminent failure. The actual implementation of the SMART utility is usually a function of the goals of the manufacturer, and the specifics of the drive itself. For example, a SMART methodology may include monitoring an average number of ECC error corrections performed per sector read from a disk. Based on statistical knowledge and through examining trends over time, it may be possible to predict the formation of bad sectors or total drive failure.

In RAID, rebuild is a process to reconstruct a physical drive from the remaining stripe(s) in the row. In case of RAID Level 1, the data is read from the mirror drive and is written onto the drive that is being rebuilt. In the case of RAID levels 3, 4 and 5, data is recovered from the peers and is then written on the disk that is being rebuilt, using appropriate XOR operations.

Replication is utilized in this document to describe copying of data from a drive that gave a SMART predictive failure warning, to a fresh new disk before it fails. This may be done online as well as offline. This method is much faster than doing a full rebuild as described earlier, since this method does not require the reading of blocks from all other drives and computing an XOR.

A HOTSPARE is a drive in a RAID configuration that does not take part in RAID data storage, but will be used in case of replacing a failed or removed drive.

Implementation

A drive, which has given SMART indication, may be a part of a variety of situations, such as one of the following:
1) Non redundant RAID with available slot in the enclosure
2) Redundant RAID with available slot in the enclosure
3) Non redundant RAID with HOTSPARE available
4) Redundant RAID with HOTSPARE available
5) Redundant RAID with no available slot in the enclosure
6) Non redundant RAID with no available slot in the enclosure Each of these situations will be addressed in the following. However, it should be apparent that additional situations are contemplated by the present invention, the following discussion merely an exemplary discussion thereof.

Non Redundant Raid with Available Slot

When a drive gives a SMART indication, it is possible to perform a replication with the Logical drive being online. After the drive gives a SMART indication, the administrator can initiate a replication of the drive, which has given SMART indication, as soon as he can get the replacement entry drive. However, it can also be done offline by using utilities that are provided for configuration during POST.

The recovery process is explained with the reference to the exemplary embodiment show in FIG. 1. For purposes of the following discussion, the enclosure has N+1 slots, a RAID system is employed, such as RAID0 or degraded RAID1 or RAID5 with Drive 1, Drive 2, Drive 3, . . . up to Drive N. In the following example, Drive 1 gives a SMART indication, and a new (or good) drive, Drive X is available.

To perform the replication in the following example, a new (good) Drive X is inserted into an available slot in the enclosure. A replication process is started, to copy the SMART indicating drive, in this instance Drive 1, to the new drive, Drive X. If a read/write I/O is received by the array for Drive 1, a read is performed from Drive 1, while in the instance of a write, the write is issued to both drives, Drive 1 and Drive X. When replication is completed, the SMART indicated Drive, Drive 1, is removed. The RAID firmware will write the new configuration automatically, since the disk order has changed. Thus, in this example, the array remains available to users of the data storage system while promoting system and data integrity. Further, watermarks may be utilized to provided additional functionality. For instance, a watermark may be utilized for load-balancing when performing a read, utilized so that writes would not have to be performed below the watermark, and the like as contemplated by a person of ordinary skill in the art.

Redundant Raid with Available Slot

Here the drive, which has given SMART indication, may be replicated similarly as Non-Redundant Drive with Available Slot, as described previously. But, the fact that the Logical drive is redundant can be used to resolve any medium errors that the SMART drive has. The previous assumptions and steps as described previously to recover data hold well even in this situation.

During the replication, if a medium error is encountered in a block of data, it may be recovered using data from other drives. The process is explained below with reference to FIG. 2. In the embodiment 200 shown in FIG. 2, the enclosure has N+1 slots, a RAID system is employed, such as RAID0 or degraded RAID1 or RAID5 with Drive 1, Drive 2, Drive 3, ... up to Drive N. In the following example Drive 1 gives a SMART indication, and a new (or good) drive, Drive X is available.

To perform the replication in the following example, a new (good) Drive X is inserted into an available slot in the enclosure. A replication process is started, to copy the SMART indicating drive, in this instance Drive 1, to the new drive, Drive X. As before, if a read/write I/O is received by the array for Drive 1, a read is performed from Drive 1, while in the instance of a write, the write is issued to both drives, Drive 1 and Drive X. If a media error is encountered, data is recovered form other stripes in the row, such as by using RAID logic, and the data is written to Drive X. When the replication is completed, Drive 1 is removed. Again, the RAID firmware will write the new configuration automatically, since the disk order has changed.

Non Redundant Raid with Available Hotspare

This process is substantially similar to the previously discussed examples, except that a drive does not have to be inserted into an empty slot. Moreover, the system administrator may configure for this method to occur fully automated without any user intervention. The recovery process will be discussed with reference to the embodiment of the present invention shown in FIG. 3.

In the embodiment 300 shown in FIG. 3, the enclosure has N+1 slots, a RAID system is employed, such as RAID0 or degraded RAID1 or RAID5 with Drive 1, Drive 2, Drive 3, ... up to Drive N. In the following example Drive 1 gives a SMART indication and HOTSPARE Drive X is available with enough capacity to include the desired data.

The whole process may be fully automatic, as no user interaction is required. Additionally, the process may be performed manually as follows. The replication process may be started manually after getting SMART indication, or the RAID firmware will start automatically to copy Drive 1 on Drive X. If read/Write input/output comes for the drive giving the SMART indication, in this instance Drive 1, the read is performed from Drive 1. A write is issued to both the HOTSPARE drive and the SMART drive, in this instance Drive 1 and Drive X. When replication is over, the new configuration is written by the RAID firmware since the disk order has changed.

Redundant Raid with Available Hotspare

Here the drive, which has given SMART indication, may be replicated similarly as the previous example, Non-Redundant Drive with Available HOTSPARE. But, the fact that the Logical drive is redundant may be used to resolve encountered medium errors of the SMART drive. Additionally, as mentioned earlier, the complete process can be fully automated.

During the replication, if a medium error is encountered on any block, it may be recovered using data from other drives. The detailed process is explained below with reference to the exemplary embodiment 400 shown in FIG. 4.

In the embodiment 400 shown in FIG. 4, the enclosure has N+1 slots, a RAID system is employed, such as RAID0, degraded RAID1 or RAID5, with Drive 1, Drive 2, Drive 3, ... up to Drive N. In the following example Drive 1 gives a SMART indication and HOTSPARE Drive X is available.

The replication process may be started manually after getting a SMART indication, RAID firmware may start the process automatically, and the like as contemplated by a person of ordinary skill in the art. The SMART indicating drive, Drive 1, is copied to the HOTSPARE drive, Drive X. Again, if a read/write input/output is received for the SMART indicating drive, the read is performed form the SMART indicating drive, while a write is issued to both drives, in this instance Drive 1 and Drive X. If a media error is encountered, data is recovered from other stripes in the row using RAID logic. The recovered data is written to the HOTSPARE drive, Drive X. When replication is over, the new configuration is written by the RAID firmware since the disk order has changed.

Redundant Raid with No Available Slot

If the logical drive is redundant, the drive, which has given SMART indication, may be replaced by utilizing a rebuild operation, so that the logical drive may continue to do perform input/output operations.

For example, the drive which has given the SMART indication may be failed, so that the logical drive is degraded. The drive is then replaced with a "good" drive, and a logical drive rebuild initiated.

The above-mentioned three steps are straightforward and simple. But, rebuilding may not be possible for sectors where there are medium errors. For example, referring now to FIG. 5, an exemplary embodiment of the present invention is shown where blocks with "medium" errors in storage devices of a RAID array 500 are shown. For the four stripes shown, there are some blocks with media error in the shown drives. In this case, for the stripes the media error occurs, the other strips in the same row are good. Since this is a redundant RAID configuration, the data for the stripes containing the media error block may be recovered by using appropriate RAID algorithm.

If the drive giving the SMART error indication is removed, it will not be possible, typically, to recover the above mentioned media error. Hence, before recovering data for a drive with a SMART error, a fast check may be performed for consistency using the following steps. A VERIFY command is issued to each block of the drives to find media errors, assuming the logical devices are already consistent. For the blocks where a media error occurs, the blocks are rebuilt by using XOR operation from data on other drives, data copied in case of RAID 1, and the like.

After this the earlier steps to rebuild may be followed. For example, as shown in the embodiment depicted in FIG. 6, a fast check for consistent for all drives is performed. The drive which has given the SMART error is removed and replaced with a new empty drive, Drive X. Drive X is then rebuilt from the data contained on the rest of the drives.

Non-Redundant Raid with No Available Slot

In an online RAID configuration, when a drive gives a SMART indication, it is necessary to take the logical drive offline to do the replication. After a drive gives SMART indication, the administrator may configure a way to perform a replication. For example, the administrator may take the logical drive offline at a convenient time while keeping the system online after physical drive gives a SMART indication. Additionally, the administrator may wait for a convenient time to make the system offline, after seeing that a drive has given SMART indication. The replication may be done utilizing an offline configuration utility. If the drive giving SMART indication is part of OS drive, the replication should be done from offline configuration utilities only.

Referring now to FIG. 7, an exemplary embodiment of the present invention is shown a SMART indication in a RAID array with no available empty slots in the array is shown. For purposes of the following discussion, the enclosure has N+1 slots, a RAID system is employed, such as RAID0 or degraded RAID1 or RAID5 with Drive 1, Drive 2, Drive 3, . . . up to Drive N. In the following example Drive 1 gives a SMART indication, and a new (or good) drive, Drive X is available.

First, the Logical drive or drive group is taken offline. Any drive other that the drive giving the SMART indication is removed, in this instance, Drive 3 is removed. A new, i.e. "good," drive is inserted into the slot vacated by the removed drive. The new drive is then replicated with the data from the drive which gave the SMART indication, e.g. Drive 1 is copied to Drive X. The drive which gave the SMART indication is then removed. The drive which was previously removed to insert the new drive is inserted into the slot of the Drive which gave the SMART indication, e.g. Drive 3 is inserted into the Drive 1 slot. The new configuration is then written after drive roaming is performed, since the disk order has changed. This will also take care of the situation in which multiple replications are performed at the same time.

SUMMARY AND CONCLUSION

In the current implementation, a replication method is utilized instead of rebuild in most cases for data recovery, which makes this process much faster. Also, the logical drive is kept online for most of the cases, thus use of the data storage system is not interrupted. An uninterrupted recovery process even in cases of non-redundant drives is a great benefit to users. Additionally, the system administrator does not need to backup and restore the system, thus automating most of the job, thereby making the method much less prone to error. With the improvements in drive technology, the SMART error indication has improved tremendously with more than 70% success rate of predicting a failure. Thus, the present invention may greatly benefit system uptime and overall efficiency.

It is believed that the system and method of the present invention and many of its attendant advantages will be understood by the forgoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof. It is the intention of the following claims to encompass and include such changes.

What is claimed is:

1. A system, comprising:
   a plurality of data storage devices capable of giving a SMART indication, the plurality of data storage device arranged as a RAID array, in which a SMART indication from a data storage device is issued, data from the data storage device which originated the SMART indication is replicated to a second data storage device that was not originally configured for data storage in the RAID array with the plurality of data storage devices, and the data storage device which originated the SMART indication from the RAID array is removed after replication is completed, thereby obtaining the second data storage device and the plurality of data storage devices configured as a RAID array, a data storage device of the plurality of data storage devices which did not originate the SMART indication being removed, the removed data storage device being replaced with the second data storage device so that data is replicated from the data storage device which originated the SMART indication to the second data storage device, once replication is complete, the data storage device which originated the SMART indication is replaced with the removed data storage device.

2. The system as described in claim 1, wherein a new configuration is written automatically by RAID firmware of the RAID array after replication is completed in response to a new ordering of the data storage devices.

3. A method, comprising:
   receiving a SMART indication from a data storage device included in a plurality of data storage devices configured as a RAID array;
   removing a data storage device of the plurality of data storage devices which did not originate the SMART indication;
   replacing the removed data storage device with a second data storage device, the second data storage device not originally configured in the RAID array with the plurality of data storage devices for data storage;
   replicating data from the data storage device which originated the SMART indication to a second data storage device;
   removing the data storage device which originated the SMART indication from the RAID array; and
   replacing the data storage device which originated the SMART indication in the RAID array with the removed data storage device.

* * * * *